Patented Sept. 27, 1932

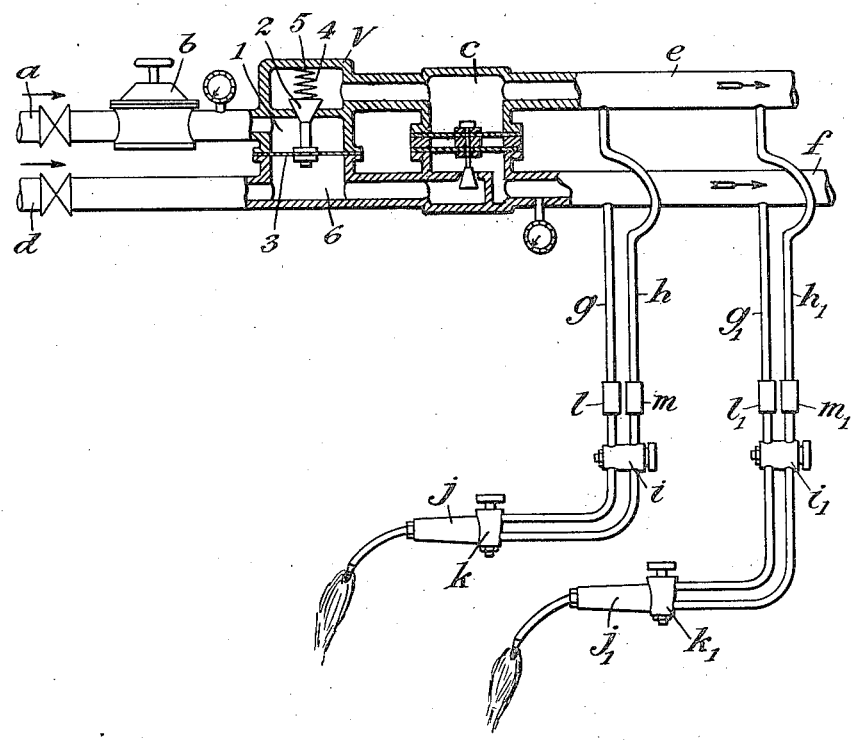

1,879,940

UNITED STATES PATENT OFFICE

FRANCESCO MANGIAMELI, OF DUSSELDORF, GERMANY

METHOD OF SUPPLYING GASES TO WELDING TORCHES AND THE LIKE

Application filed March 28, 1930, Serial No. 439,718, and in Germany October 4, 1929.

The present invention relates to an improvement of the balanced pressure method of mixing two gases, for example oxygen and acetylene, for use in connection with welding torches and the like, according to the Patent 1,619,948. As is known, this system consists in using the service pressure of one of the two gases, for example oxygen, for controlling the service pressure and the flow of the second gas, acetylene, by means of a regulating device, so that the two gases flow from the regulator to the welding torch under automatically obtained equal pressure. It is evident, that if the pressure of flow of the second gas, acetylene, to the regulator is not higher than, or at least equal to the service pressure of the first gas, oxygen, the desired balance of pressure between the two gases cannot be established. Also the oxygen will flow alone to the welding torch if the flow of acetylene to the regulator is for any reason stopped. The consequence of this would be a back flow of oxygen in the main acetylene piping and the possibility of back fire or explosions.

A further inconvenience consists in the fact that if more than one welding pipe is connected with a central source of supply of the two gases, a pressure regulating device is necessary for each welding torch, as the desired service pressure differs in the case of each torch according to the work to be performed.

The present invention avoids all these drawbacks. For this purpose the pressure of flow of the acetylene to the regulator is used to control a valve interposed in the mains of the two gases, this valve being so arranged that the flow of oxygen to the regulator is only possible if the pressure of flow of the acetylene is higher than the service pressure of the oxygen, whilst if the pressure of the acetylene is lower, said valve prevents further flow of the oxygen to the regulator. As the pressure and the flow of the acetylene to the torch is controlled by the service pressure of the oxygen during its passage through the regulator it is evident that in the service mains leading the gases to the welding torch there will be either a flow of the gases at balanced pressure or no flow at all.

For the purpose of the gas supply from two central mains to a number of welding torches the balance of pressure is obtained at a central point by means of a central regulator by which the service pressure of one gas controls the pressure of the other one, so that the two gases flow in two common mains at an automatically balanced pressure, this pressure being somewhat higher than the highest pressure necessary for the service of the welding torches. By means of a combined cock fitted at each branch leading to each welding torch the balanced pressure can be conveniently reduced simultaneously so that at the outlet of the cock the balance of pressure is maintained. It is evident that if safety devices or the like are interposed in the mains, the dimensions of these devices should be such that the loss of pressure of both gases is equal. In the case of water-seal valves for instance, it would be sufficient to balance the water level.

The annexed drawing, which is partly a vertical section, illustrates one form of construction of the invention.

In this drawing the service pressure of the first gas, oxygen, flowing through the pipe $a$ is controlled by the regulator $b$ in the ordinary manner. The oxygen enters the chamber 1 of the valve V in which is fitted a plug 2 connected to a diaphragm 3. Owing to the pressure of the oxygen upon the diaphragm the plug 2 prevents the flow of the oxygen to the chamber 4 and to the regulator $c$, which is preferably of the type shown in the patent aforesaid, the spring 5 ensuring that the plug is in its position of closure. The second gas, acetylene, flowing through the pipe $d$ on its way to the regulator $c$ passes through the chamber 6 of the valve V, and acts upon the diaphragm 3. If the acetylene pressure is higher than the oxygen pressure at the opposite side of the diaphragm the plug 2 will be moved from its position of closure and the oxygen enabled to flow to the chamber 4, the regulator $c$ and the service main $e$. As in this regulator the flow of the acetylene to the main and its service pressure are dependent upon the pressure of the oxygen, the two gases flow to the mains $e$, $f$ respectively at a balanced pressure.

If the pressure of the acetylene in the chamber 6 is lower than the pressure of the oxygen in the chamber 1 of the valve V the plug 2 is kept closed, and as the oxygen cannot flow to the regulator $c$ the passage of the acetylene through this regulator to the main is consequently obstructed.

To the main-pipes $e$ and $f$, which may be fitted as two closed circuits, are secured the branch pipes $g$, $h$ and $g'$, $h'$ for the supply of the gases to the welding torches, the cocks $i$ and $i'$ being adapted to reduce the pressure of the two gases in the pipes $e$ and $f$ to the service pressure suitable for each torch $j$, $j'$. The construction of the cocks $i$, $i'$ is such that at every position of synchronous opening there is an equal loss of pressure for both gases after their passage through the cock. Consequently, the balance of pressure is maintained and the two gases flow at an equal pressure to the welding torches, through the supply regulating devices $k$, $k'$. It is also evident that the devices $k$, $k'$ which are adapted to control the quantity of gases admitted to the mixing chamber can be conveniently combined with the pressure reducing cocks $i$, $i'$.

The water columns in the safety valves $l$ and $m$ and $l'$, $m'$ should, as stated before, be maintained at an equal level.

Having now particularly described and ascertained the nature of my said invention and in what manner the same is to be performed, I declare that what I claim is:—

1. Apparatus for controlling the supply of gases to welding torches and the like, comprising a conduit for each gas, a balanced pressure regulating device operated by the service pressure of one of said gases to regulate and equalize the service pressure of the other of said gases, a valve in one conduit in advance of said regulating device, and means subject to pressure in both conduits for controlling said valve.

2. Apparatus for controlling the supply of gases to welding torches and the like, including conduits for the respective gases and a balanced pressure regulating device operated by the service pressure in one of said conduits to control and equalize the service pressure in the other conduit, a valve in one of said conduits, a chamber connected to both of said conduits and a diaphragm in said chamber dividing the same into sections subject to the pressures in the respective conduits, said diaphragm being connected to said valve; whereby predominant pressure in one conduit will effect opening of said valve and predominant pressure in the other conduit will cause the closure of said valve.

3. Apparatus for controlling the supply of gases to welding torches and the like, comprising two conduits, a balanced pressure regulating device operated by the pressure in one conduit to regulate and equalize the pressure in the other conduit, a pressure regulator in the first conduit in advance of said device, a valve in said first conduit between the pressure regulator and said device, and a motor device connected to said valve and subject to the pressures in both conduits and operating to open the valve when the pressure in the second conduit predominates and to close the valve when the pressure in the first conduit predominates, whereby the supply of both gases will be stopped.

4. Apparatus for controlling the supply of gases to welding torches and the like, comprising two conduits, a balanced pressure regulating device operated by the pressure in one conduit to regulate and equalize the pressure in the other conduit, a pressure regulator in the first conduit in advance of said device, a valve casing connected to both conduits, a valve therein controlling the flow in the first conduit and a diaphragm in the casing connected to and operating the valve and operated by differential pressures in said conduits.

Dated this 5th day of March, 1930.

FRANCESCO MANGIAMELI.